No. 645,797. Patented Mar. 20, 1900.
J. W. ESHELMAN, Jr.
SEWING MACHINE.
(Application filed June 30, 1899.)
(No Model.)
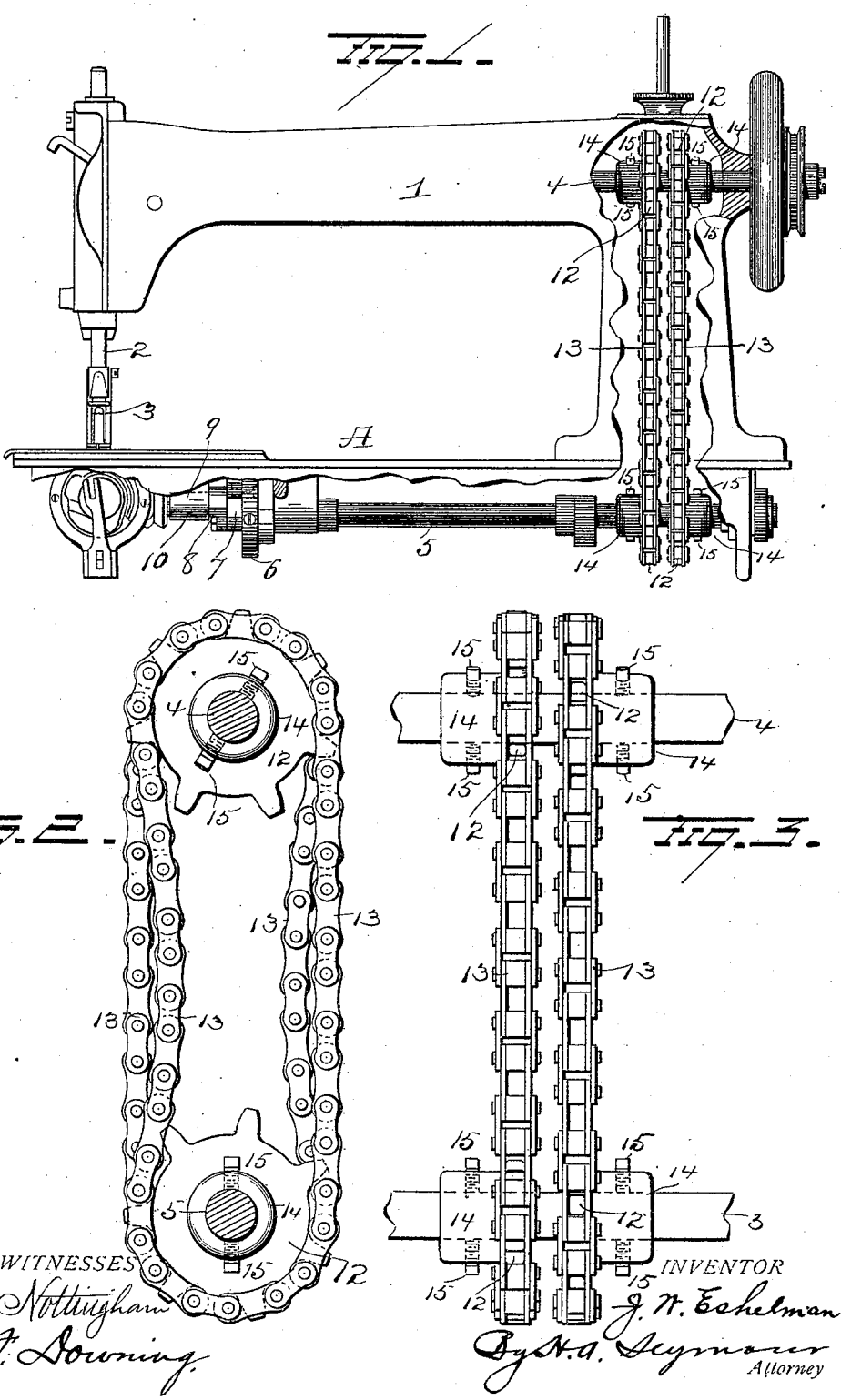
WITNESSES
E. J. Nottingham
G. F. Downing
INVENTOR
J. W. Eshelman Jr.
By H. A. Seymour
Attorney

UNITED STATES PATENT OFFICE.

JOHN W. ESHELMAN, JR., OF READING, PENNSYLVANIA.

SEWING-MACHINE.

SPECIFICATION forming part of Letters Patent No. 645,797, dated March 20, 1900.

Application filed June 30, 1899. Serial No. 722,441. (No model.)

*To all whom it may concern:*

Be it known that I, JOHN W. ESHELMAN, Jr., a resident of Reading, in the county of Berks and State of Pennsylvania, have invented certain new and useful Improvements in Sewing-Machines; and I do hereby declare the following to be a full, clear, and exact description of the invention, such as will enable others skilled in the art to which it appertains to make and use the same.

My invention relates to an improvement in sewing-machines, one object of the invention being to provide improved means for transmitting motion from one shaft to the other in a sewing-machine.

A further object is to simplify and improve what is known as the "Wheeler & Wilson" sewing-machine.

With these objects in view the invention consists in certain novel features of construction and combinations and arrangements of parts, as will be more fully hereinafter described, and pointed out in the claims.

In the accompanying drawings, Figure 1 is a view in side elevation, showing the frame partly broken away, illustrating my improvements; and Figs. 2 and 3 are detail views.

The bed-plate A, the overhanging arm 1, having at its front end bearings for the needle-bar 2 and for the presser-foot bar 3, the main rotating shaft 4, and the under shaft 5 are all common to what is known as the "Wheeler & Wilson" machine. The under shaft 5 is provided at its end with a disk 6, having a crank-pin thereon, which secures a link 7, and the opposite end of said link is connected with a crank 8, attached to the short shaft 9, (shown in dotted lines as mounted in a bearing 10,) the axis of the short shaft 9 being out of line to the axis of the under shaft 5 and rotated by the under shaft 5 at a variable speed, due to the said link connection, as is well understood in the Wheeler & Wilson form of sewing-machine. This peculiar variable motion of the short shaft 9 results in a constant strain on the means for transmitting motion from the main shaft 4 to the under shaft 5, and my invention is intended to take up or absorb such peculiar motion without injury or perceptible wear to any portion of the machine, as will now be pointed out.

Two sprocket-wheels 12 are disposed on each shaft 4 and 5 in alinement with each other, and a sprocket-chain 13 connects each pair of sprocket-wheels. The sprocket-wheels are each provided with elongated bearing-sleeves 14, and set-screws 15 are provided in said sleeves for locking the sprocket-wheels to their shafts. When the sprocket wheels and chains are in place, three of the wheels are locked to their shafts and the fourth wheel turned to tighten one side of one chain and the opposite side of the other chain, when the fourth wheel is secured to its shaft and the parts will have assumed the position clearly shown in Fig. 2. It will thus be seen that the taut sides of both chains will coöperate to operate the mechanism without lost motion, and at the same time the chains thus arranged will permit a certain amount of elasticity to take up the peculiar straining or variable motion of the shaft 9.

If desired, three of the sprocket-wheels can be permanently secured to the shafts and one removably locked by any approved means, so as to permit the tightening of the chains when desired.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a sewing-machine, the combination of a driving-shaft, sewing mechanism, gearing between the driving-shaft and sewing mechanism, a driven shaft operating a variable-speed device for feeding devices, and a yielding transmitting device between the driving and driven shafts.

2. In a sewing-machine, the combination with a main shaft, another shaft spaced therefrom and feed mechanism driven at a variable speed by the latter shaft, of a sprocket-wheel on each shaft, a sprocket-chain connecting said sprocket-wheels and means for tightening said chain.

3. In a sewing-machine, the combination with a main shaft, an under shaft and a feed mechanism driven at a variable speed by the under shaft, of sprocket-wheels on each shaft, chains connecting each pair of sprocket-wheels and means for adjustably securing one of said sprocket-wheels to its shaft so as to permit said sprocket-wheel to be turned to tighten all of the chains.

4. In a sewing-machine, the combination with a main shaft, an under shaft and a feed mechanism driven at a variable speed by the under shaft, of two sprocket-wheels on each shaft, a sprocket-chain connecting each pair of sprocket-wheels, three of said sprocket-wheels secured to their shafts and means on the other sprocket-wheel for removably locking it to its shaft.

In testimony whereof I have signed this specification in the presence of two subscribing witnesses.

JNO. W. ESHELMAN, JR.

Witnesses:
  ANNIE E. JACOBS,
  BERTHA A. POUJOL.